United States Patent [19]
Taylor et al.

[11] Patent Number: 6,012,885
[45] Date of Patent: Jan. 11, 2000

[54] CARGO CHOCK

[75] Inventors: Charles F. Taylor, South Irvine; Clive A. Hawkins, Corona Del Mar, both of Calif.

[73] Assignee: DZN, Incorporated, Irvine, Calif.

[21] Appl. No.: 09/169,465

[22] Filed: Oct. 9, 1998

[51] Int. Cl.⁷ .................................................. B60P 7/08
[52] U.S. Cl. .............................. 410/94; 410/90; 410/121
[58] Field of Search ............................... 410/94, 95, 121, 410/153, 155, 117, 90; 296/39.2; 188/32; 224/403, 42.33

[56] References Cited

U.S. PATENT DOCUMENTS

| | | | |
|---|---|---|---|
| 999,828 | 8/1911 | McNaughton | 410/94 |
| 1,432,421 | 10/1922 | Smith | 410/95 |
| 1,559,827 | 11/1925 | Wittman | 410/94 X |
| 4,200,046 | 4/1980 | Koliba et al. | 410/94 |
| 4,217,831 | 8/1980 | Koliba et al. | 410/121 |
| 4,311,420 | 1/1982 | Hendricks et al. | 410/121 |
| 4,955,771 | 9/1990 | Bott | 410/94 |
| 5,549,428 | 8/1996 | Yeatts | 410/94 |
| 5,655,863 | 8/1997 | Mundt | 410/94 |

FOREIGN PATENT DOCUMENTS

| | | | |
|---|---|---|---|
| 667558 | 7/1963 | Canada | 224/42.33 |

*Primary Examiner*—Stephen T. Gordon
*Attorney, Agent, or Firm*—Lyon & Lyon LLP

[57] ABSTRACT

A cargo chock for a cargo bed which has a corrugated liner defining channels and ridges. The chock includes a base having a top with a planar area and a bottom with alternating channels and ridges which mate with the liner of the cargo bed. An upstanding ridge in the form of a cross is arranged on the top. The upstanding ridge includes sides which are normal to the planar area of the top and an upper surface which includes an apex from which the elements of the cross extend downwardly toward the ends thereof. The elements of the cross are aligned parallel to and perpendicular to the channels of the bed, respectively. The element lying parallel to the channels of the cargo bed is displaced laterally to create additional adjustment capability.

8 Claims, 4 Drawing Sheets

6,012,885

CARGO CHOCK

BACKGROUND OF THE INVENTION

The field of the present invention is restraints for cargo.

Cargo on most transporting vehicles is often constrained from sliding about the cargo bed. Ropes, chains and straps are frequently employed. Such tie-down restraint systems are both versatile and effective. However, use of tie-down restraints is typically labor intensive, subject to failure due to operator error in deploying the restraint and can require a fair amount of time to apply.

Adjustable systems have been developed for some cargo beds. Typically the system includes sockets or rails associated with the bed to support stops brought into place to control cargo movement. Such systems are not adapted for highly versatile requirements and are typically found on more dedicated conveyance systems.

Pickup trucks and other light vehicles having cargo beds frequently are used for light duty conveyance requiring versatile constraints. Where light duty includes short trips, the extended time necessary to apply a tie-down system becomes inconvenient. Further, such light duty conveyances such as pickup trucks frequently have cargo bed liners not easily adapted to an installed system with sockets or rails to accommodate movable stops.

SUMMARY OF THE INVENTION

The present invention is directed to an easily and quickly installed versatile cargo chock which has channels and ridges on one side of a base to engage with alternating channels and ridges on a cargo bed. On the top of the device, an upstanding ridge is arranged to receive a perimeter location on the cargo. Cargo extends to a location atop the chock such that the cargo itself contributes to the placement of the chock while the chock then constrains the cargo.

In a first separate aspect of the present invention, the upstanding ridge atop the chock is formed in a cross. The cross provides four separate areas for engaging the corners of cargo boxes and the like.

In a second separate aspect of the present invention, the upper surface of the upstanding ridge may slope to accommodate the receipt of bulk packaging to further both lock the chock in place and constrain the cargo.

In a third separate aspect of the present invention, the pattern of the engaging lower surface and the pattern of the upstanding ridge forming a stop are displaced to allow a more versatile fit through rotation of the chock.

In a fourth separate aspect of the present invention, it is contemplated that any of the foregoing aspects may be employed in combination.

Accordingly, it is an object of the present invention to provide an improved versatile cargo restraint. Other and further objects and advantages will appear hereinafter.

DETAILED DESCRIPTION OF THE PREFERRED EMBODIMENT

Figure 1:
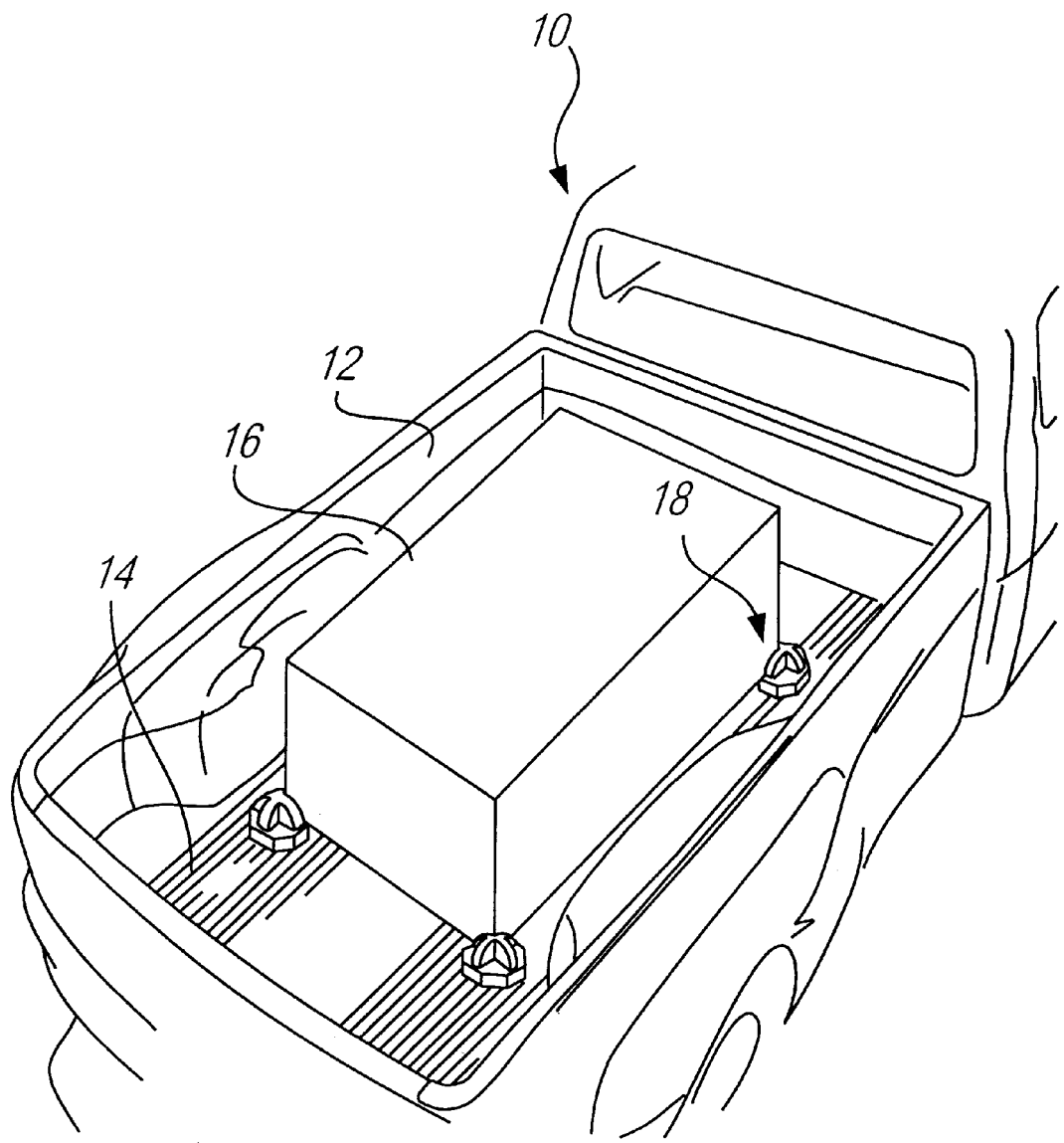
FIG. 1 is a perspective view of a cargo bed with cargo therein held by chocks.

Turning in detail to the drawings, FIG. 1 illustrates a pickup truck 10 having a cargo bed 12. The cargo bed 12 is shown to have a liner 14 which has alternating channels and ridges most typically provided by a corrugation of the liner. Cargo in the form of a box 16 is shown positioned in the cargo bed 12 and held in chocks, generally designated 18, three of the four employed being illustrated.

Figure 2:
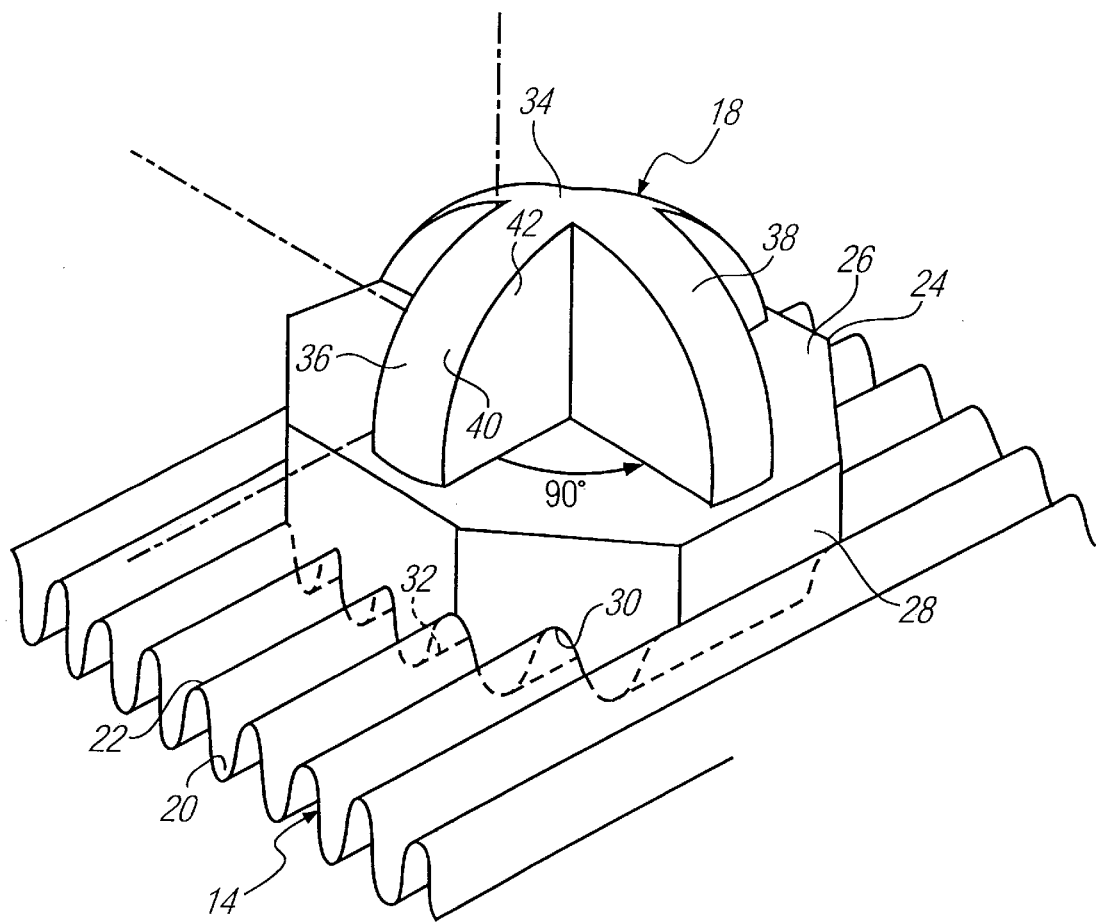
FIG. 2 is a perspective view of a cargo chock positioned on a cargo bed liner.

Looking in greater detail, FIG. 2 illustrates the liner 14 of the cargo bed 12 which includes corrugations defining alternating channels 20 and ridges 22. Such liners 14 are typically positioned so that they are unable to slide about the cargo bed 12 of the truck 10. Consequently, the liners 14 thus provide a stable platform upon which to secure cargo. The liners are also typically of polymeric material upon which elastomeric material is unlikely to slide.

Figure 5:
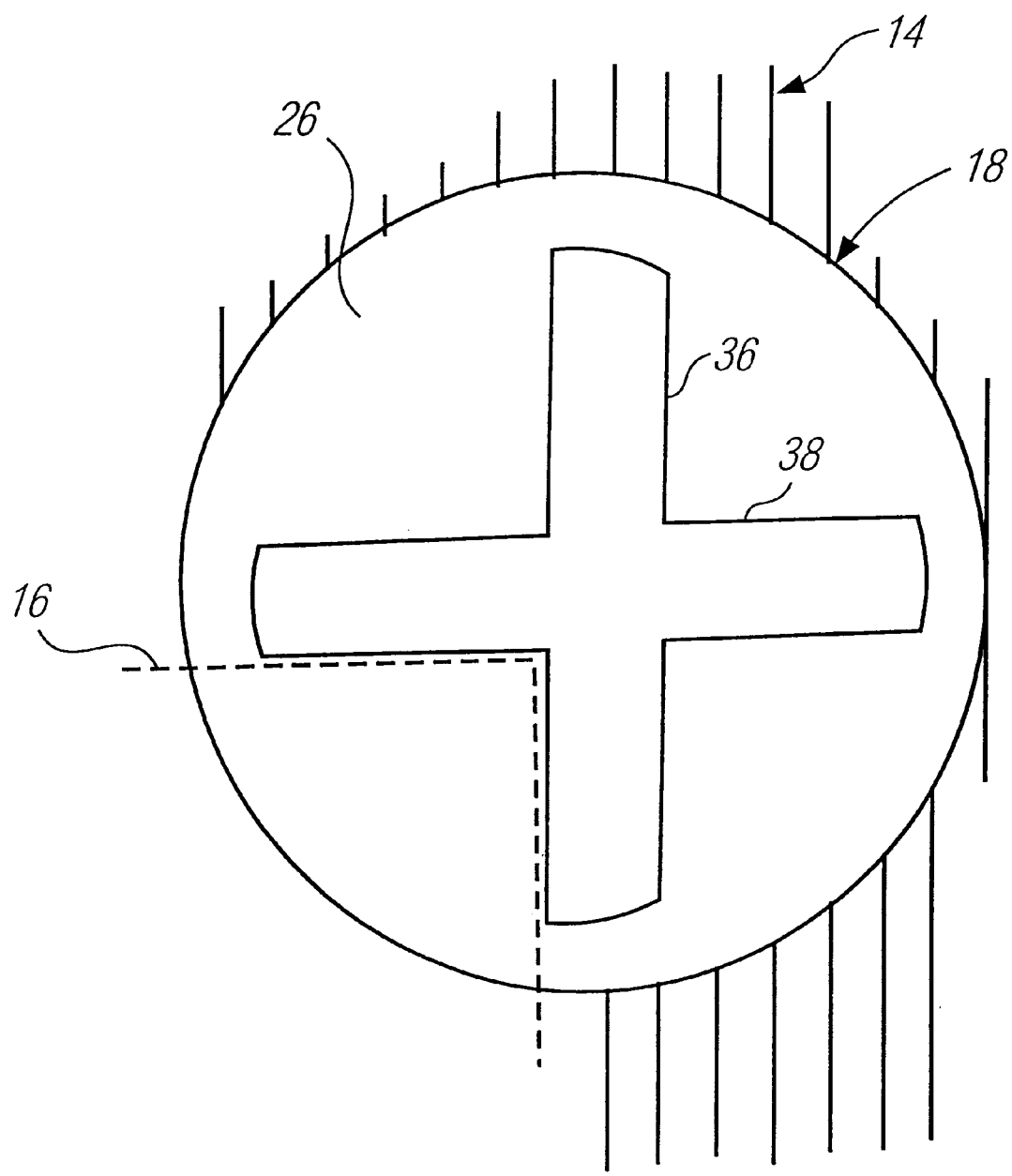
FIG. 5 is a plan view of a cargo chock.

The chock, generally designated 18, is illustrated in FIG. 2 in association with the liner 14. It is preferably integrally formed of elastomeric material. Although the chock is preferably integrally formed, it may be best described here in terms of the elements thereof. The chock 18 includes a base 24. The base 24 has a top 26 which has a planar area. The base 24 of the chock 18 includes sides 28 which define an octagonal arrangement in plan. A circular arrangement is seen in FIG. 5. The base 24 further includes a bottom defining alternating channels 30 and ridges 32.

The channels 30 and ridges 32 of the bottom of the base 24 substantially mate with the channels 20 and ridges 22 of the liner 14 forming the cargo bed 12. As mentioned above, the liner 14 is typically of polymeric material while the base 24 is preferably elastomeric to create substantial friction therebetween. This mating of the base 24 with the liner 14 naturally has an interference engagement in the sense of the chock 18 moving laterally of the cargo bed 12. Even so, friction acts in this direction as well. In the longitudinal direction of the cargo bed 12, parallel to the channels 20 and ridges 22 of the liner 14, friction provides the resistance to sliding between components.

An upstanding ridge 34 is positioned on top of the base 24. This ridge 34 is shown to be in the shape of a cross in plan. This cross may be thought of as defining a first elongate ridge element 36 and a second elongate ridge element 38. These two ridge elements 36 and 38 are perpendicular to one another with the elongate ridge element 36 being parallel to the channels 30 and ridges 32 on the bottom of the base 24. The upstanding ridge 34 has an upper surface 40 bounded by sides 42 which are perpendicular to the planar area of the top 26 of the base 24. The upper surface 40 extends from an apex near the center of the chock 18 as seen in plan down to the ends of the cross defined by the upper surface. These extensions are shown to be convex curves and indeed may be formed as segments of a circle.

Referring specifically to FIG. 5, it can be seen that the elongate ridge element 36 is offset laterally from the center of the chock 18 as illustrated in plan. To create the maximum adjustment through rotation of the chock 18, the offset should be one-quarter of the pitch of the channel and groove corrugation of the liner 14. If the pitch may be considered as one unit, 180° rotation of the chock 18 with the elongate ridge element 36 offset by one-quarter of that unit, the difference in position of the effective stop is changed by one-half a unit. Thus, the chock is able to provide a full unit adjustment through placement one pitch laterally or a half unit of adjustment through rotation of the chock 18 180°.

Figure 3:
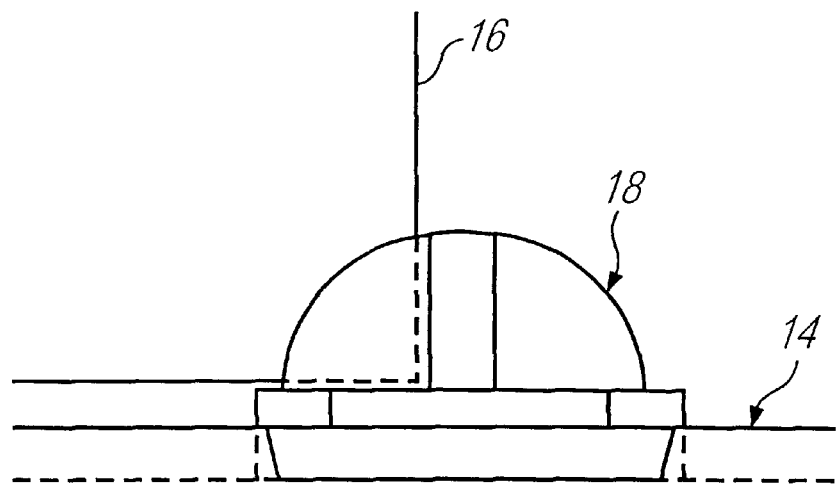
FIG. 3 is a side view of a cargo chock with rectilinear cargo associated therewith.
Figure 4:
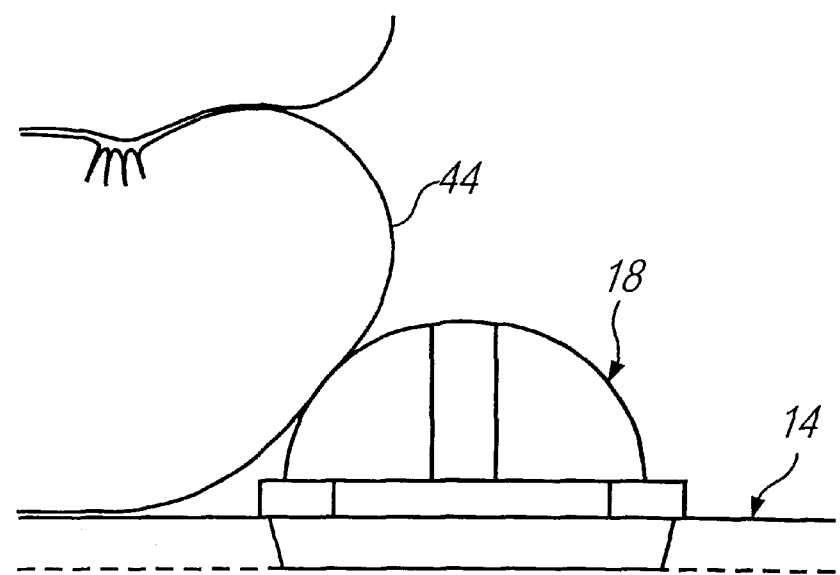
FIG. 4 a side view of a cargo chock with nonrectilinear cargo associated therewith.

Examples of the chock 18 employed in operation are illustrated in FIGS. 3 and 4. In FIG. 3, a rectilinear shape is contemplated such as a box 16. The box would be placed in the cargo bed on a liner 14. A chock 18 would then be positioned snug against the box longitudinally of the channels 20 and ridges 22 of the liner 14. If the box does not fit into a corner defined by the elongate ridge elements 36 and 38, and if the box cannot be moved laterally, the chock 18 is oriented to most closely approach contact with the box. The box is lowered onto the top 26. The downward force of the box 16 on the top 26 retains the bottom of the base 24 engaged with the channels 20 and ridges 22 of the liner 14. The weight of the cargo increases the resistive friction force of the chock 18. A second or more chocks may then be employed about the cargo depending on the degrees of freedom of the box 16 within the cargo bed 12.

With the more amorphous shape of the cargo 44 in FIG. 4, representing, for example, a bag of particulate material, the chock 18 cannot be exactly placed with a corner. Rather, the cargo 44 rests against the upper surface 40 of the upstanding ridge 34 as shown. Again, the weight of the cargo increases the resistive friction and provides and appropriate locking of the cargo in place.

Thus, an improved versatile chock for association with a cargo bed having alternating channels and ridges is disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A cargo chock for a cargo bed having alternating channels and ridges, comprising
   a base including a top having a planar area and a bottom having alternating channels and ridges substantially matable with the alternating channels and ridges of the cargo bed;
   an upstanding ridge forming a cross in plan on the top of the base, the upstanding ridge including sides normal to the planar area and an upper surface having an apex substantially at the center of the cross and extending down toward the top of the base at the ends of the cross.

2. The cargo chock of claim 1, the base, channels and ridges on the bottom and the upstanding ridge being integrally formed.

3. The cargo chock of claim 1, the ridges on the bottom of the base being elastomeric.

4. The cargo chock of claim 1, the cross including a first elongate ridge element extending parallel to the channels and ridges of the bottom of the base and a second elongate ridge element extending perpendicular to the first elongate ridge element.

5. A cargo chock for a cargo bed having alternating channels and ridges, comprising
   a base including a top having a planar area and a bottom having alternating channels and ridges substantially matable with the alternating channels and ridges of the cargo bed;
   an upstanding ridge forming a cross in plan on the top of the base,
   the upstanding ridge including an upper surface having an apex substantially at the center of the cross and extending down toward the top of the base at the ends of the cross.

6. The cargo chock of claim 5, the upper surface having a convex curve from the apex to each end of the cross.

7. A cargo chock for a cargo bed having alternating channels and ridges, comprising
   a base including a top having a planar area and a bottom having alternating channels and ridges substantially matable with the alternating channels and ridges of the cargo bed;
   an upstanding ridge forming a cross in plan on the top of the base, the cross including a first elongate ridge element extending parallel to the channels and ridges of the bottom of the base and a second elongate ridge element extending perpendicular to the first elongate ridge element, one of the first elongate ridge element and the channels and ridges of the bottom of the base being offset from a center of the base and the other of the first elongate ridge element and the channels and ridges of the bottom of the base being centered on the base.

8. A cargo chock for a cargo bed having alternating channels and ridges, comprising
   a base including a top having a planar area and a bottom having alternating channels and ridges substantially matable with the alternating channels and ridges of the cargo bed;
   an upstanding ridge forming a cross in plan on the top of the base, the upstanding ridge including sides normal to the planar area and an upper surface having an apex substantially at the center of the cross and extending down toward the top of the base at the ends of the cross, the cross including a first elongate ridge element extending parallel to the channels and ridges of the bottom of the base and a second elongate ridge element extending perpendicular to the first elongate ridge element, one of the first elongate ridge element and the channels and ridges of the bottom of the base being offset from a center of the base and the other of the first elongate ridge element and the channels and ridges of the bottom of the base being centered on the base.

* * * * *